US010131200B2

(12) United States Patent
Patti et al.

(10) Patent No.: US 10,131,200 B2
(45) Date of Patent: Nov. 20, 2018

(54) VEHICULAR CLIMATE SENSOR IN RECIRCULATION PATH

(75) Inventors: Angelo Patti, Pleasant Ridge, MI (US); Paul B. Hoke, Plymouth, MI (US); James R. Hurd, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1347 days.

(21) Appl. No.: 13/307,349

(22) Filed: Nov. 30, 2011

(65) Prior Publication Data

US 2013/0137355 A1 May 30, 2013

(51) Int. Cl.
*B60H 1/00* (2006.01)

(52) U.S. Cl.
CPC ............... *B60H 1/00792* (2013.01); *B60H 2001/00085* (2013.01)

(58) Field of Classification Search
CPC .................................................. B60H 1/00685
USPC .......................................... 454/139, 70, 109
See application file for complete search history.

(56) References Cited

U.S. PATENT DOCUMENTS

| | | | | |
|---|---|---|---|---|
| 4,875,406 A * | 10/1989 | Holter | ................. | G01N 33/0026 454/75 |
| 5,273,487 A * | 12/1993 | Dauvergne | ..................... | 454/139 |
| 5,377,528 A * | 1/1995 | Dauvergne | ............. | B60H 1/008 165/11.1 |
| 5,435,779 A * | 7/1995 | Sharp | .................... | B08B 15/023 454/238 |
| 5,551,667 A * | 9/1996 | Galka | ....................... | F16K 1/18 251/212 |
| 5,653,386 A | 8/1997 | Hennessee et al. | | |
| 5,927,380 A * | 7/1999 | Scoccia | ............. | B60H 1/00792 165/11.1 |
| 6,112,807 A * | 9/2000 | Dage | ............................. | 165/202 |
| 6,206,775 B1 * | 3/2001 | Lemaitre | ................ | B60H 1/008 139/158 |
| 6,761,038 B1 * | 7/2004 | Bushnell et al. | ............... | 62/244 |
| 6,988,670 B2 | 1/2006 | Keen et al. | | |
| 7,377,848 B2 * | 5/2008 | Voit et al. | ...................... | 454/158 |
| 7,681,630 B2 * | 3/2010 | Klassen et al. | ............... | 165/202 |
| 7,727,058 B2 * | 6/2010 | Heilemann et al. | .......... | 454/143 |
| 7,766,734 B2 * | 8/2010 | Dietz et al. | .................... | 454/345 |
| 7,803,039 B2 * | 9/2010 | Inoue et al. | .................... | 454/75 |

(Continued)

FOREIGN PATENT DOCUMENTS

| | | | | |
|---|---|---|---|---|
| DE | 102006038711 A1 * | 2/2008 | ......... | B60H 1/00792 |
| EP | 1354738 A1 * | 10/2003 | .............. | B60H 3/00 |
| EP | 1116612 B1 | 5/2007 | | |

*Primary Examiner* — Gregory Huson
*Assistant Examiner* — Frances F Hamilton
(74) *Attorney, Agent, or Firm* — Vichit Chea; MacMillan, Sobanski & Todd, LLC

(57) ABSTRACT

An HVAC unit is provided for treating air in a passenger cabin of a vehicle. An HVAC housing has a recirculation entry section, a fresh entry section, a blower section, and an output section. A blower is mounted to the blower section for driving an airflow from the HVAC housing out through the output section into the passenger cabin. A recirculation opening is provided proximate the recirculation entry section for providing at least a base recirculation flow from the passenger cabin into the HVAC housing whenever the blower drives the airflow. A climate sensor is fluidically coupled within the base recirculation flow for sensing a climate characteristic representative of the air in the passenger cabin.

17 Claims, 7 Drawing Sheets

(56) References Cited

U.S. PATENT DOCUMENTS

| | | | |
|---|---|---|---|
| 8,364,318 B2* | 1/2013 | Grabinger | F24F 11/0001 454/256 |
| 9,017,156 B2* | 4/2015 | Davledzarov | F24F 13/1426 454/239 |
| 2003/0181158 A1* | 9/2003 | Schell | F24F 3/0442 454/229 |
| 2007/0243808 A1 | 10/2007 | Mathur et al. | |
| 2008/0245504 A1* | 10/2008 | Eisenhour | 165/43 |
| 2010/0120345 A1* | 5/2010 | Ryan et al. | 454/75 |
| 2010/0190429 A1* | 7/2010 | Dage | B60H 1/00849 454/75 |
| 2010/0224253 A1* | 9/2010 | Azar | B60H 1/00678 137/1 |
| 2011/0160914 A1* | 6/2011 | Kennett | 700/276 |
| 2012/0015594 A1* | 1/2012 | Yenneti et al. | 454/75 |

* cited by examiner

VEHICULAR CLIMATE SENSOR IN RECIRCULATION PATH

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to climate control systems in passenger vehicles, and, more specifically, to measuring interior temperature, humidity, or air quality for the purpose of controlling the operation of the climate control system.

Heating, ventilation, and air-conditioning (HVAC) systems with electronic automatic temperature control (EATC) need to obtain a measurement of an internal air temperature/humidity so that these can be controlled to a target value that is set by an occupant. Temperature and/or humidity in the passenger cabin have conventionally been measured using a small sensor or sensors located on the instrument panel ((i.e., dashboard) near the center of the vehicle. In order to provide an accurate characterization of a climate characteristic (temperature or humidity), it is desirable to ensure a significant flow of cabin air over the sensor. Conventional sensors are typically aspirated using 1) a suction line running from the HVAC air handling case to the sensor location on the instrument panel utilizing a venturi to pull air over the sensor, or 2) a small fan packaged with the sensor independent of the HVAC module. These approaches, however, can result in inadequate airflow and/or distracting noises resulting from the suction or from the motor.

SUMMARY OF THE INVENTION

HVAC air handling cases selectably draw air in from a fresh air source (i.e., external air) and a recirculation source (i.e., internal cabin air). HVAC control strategies typically employ modes which blend the internal and external air (known as partial recirculation or partial recirc) or which may completely close off one source or the other (i.e., 100% fresh or full recirc). The present invention employs at least a partial recirculation condition at all times together with relocating the climate sensor from the usual position on the instrument panel to the recirculation air intake. At this location, sufficient airflow volume will always be pulled over the sensor and the introduction of additional audible noises in the passenger cabin is avoided. The sensor may be placed proximate an opening created by or at a typical recirculation door or may be formed as a dedicated opening in the recirculation portion of the air handling case.

In one aspect of the invention, an HVAC unit is provided for treating air in a passenger cabin of a vehicle. An HVAC housing has a recirculation entry section, a fresh entry section, a blower section, and an output section. A blower is mounted to the blower section for driving an airflow from the HVAC housing out through the output section into the passenger cabin. A recirculation opening is provided proximate the recirculation entry section for providing at least a base recirculation flow from the passenger cabin into the HVAC housing whenever the blower drives the airflow. A climate sensor is fluidically coupled within the base recirculation flow for sensing a climate characteristic representative of the air in the passenger cabin.

DETAILED DESCRIPTION OF PREFERRED EMBODIMENTS

The invention places the climate sensor proximate the recirculation section of the HVAC which can result in several advantages. By removing the sensor from the instrument panel a vehicle designer can achieve better aesthetics, and additional packaging space is freed up for other components on the instrument panel. Noise problems inherent in some prior sensing systems using a motor or a vacuum source drawing in air at the instrument panel are avoided since no motor is needed and no suction takes place at the instrument panel. Furthermore, temperature control accuracy can be improved since a larger volume of air can be pulled over the sensor regardless of the instantaneous heating, cooling, fresh air, or recirculation settings of the HVAC system.

The present invention imposes the condition that a partial recirculation condition will be in effect at all times to pull a minimum amount of cabin air over the sensor. The sensor may be placed at the recirculation intake section of the HVAC case. If always maintaining the recirculation door in a partially open condition is not desired, then a separate dedicated opening in the HVAC housing in the area of the recirculation section can be employed to allow the blower to pull in air independently of the recirculation inlet door position. To keep the HVAC housing sealed when the blower is not operating, a small flexible flap may be used to cover the dedicated opening in the manner of a one-way valve (i.e., so that suction created by the blower pulls the flap open). The sensor and recirculation opening can be placed on the door itself thereby allowing the present invention to be easily adapted to existing HVAC designs.

Figure 1:
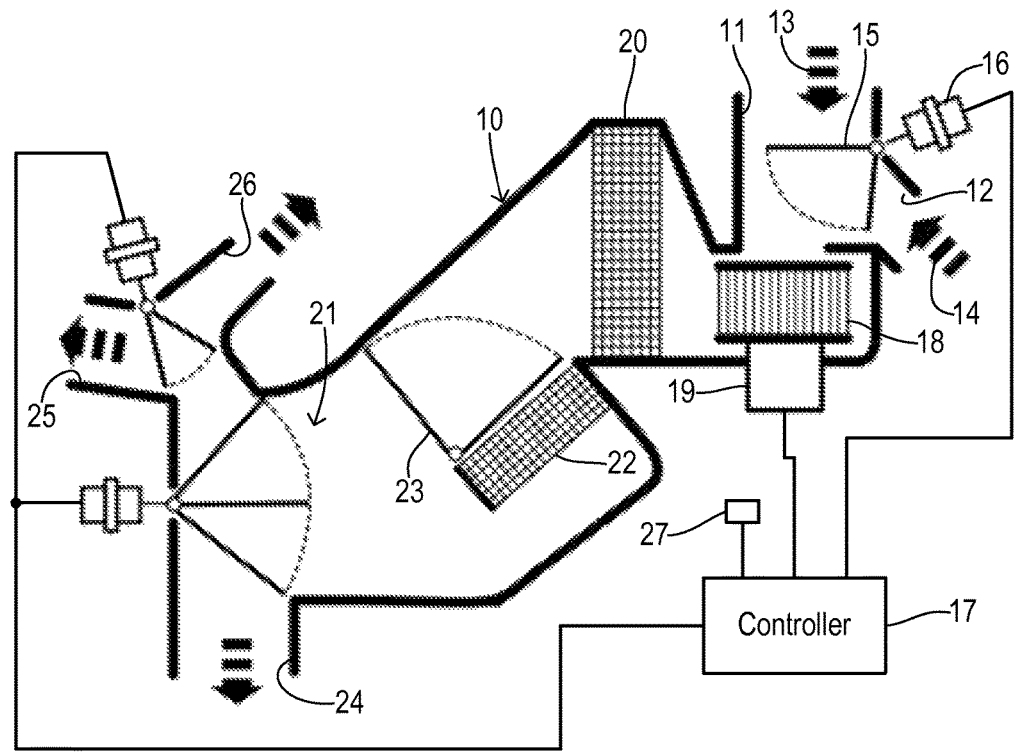
FIG. 1 is a schematic diagram showing a prior art HVAC unit.

Referring to FIG. 1, an HVAC unit 10 (also known as an HVAC air handling case) includes a fresh air entry section 11 and a recirculation entry section 12 receiving fresh outside air 13 and recirculated interior air 14, respectively. A door assembly 15 is associated with sections 11 and 12 for selecting a blend of fresh air and recirculated air according to a door position set via an actuator 16 under control of an HVAC controller 17. Air entering HVAC unit 10 is driven by a blower comprised of a fan 18 and blower motor 19 which is also controlled by controller 17.

As it passes through HVAC unit 10, the air goes from blower 18 through an evaporator 20 and into an output section 21. Air may also pass through a heater core 22 as determined by a temperature blend door 23. Output section 21 includes various outlets such as a floor outlet 24, a panel outlet 25, and a defrost outlet 26 to supply the conditioned air to the passenger cabin as determined by additional doors and actuators driven by controller 17.

A climate sensor 27 is coupled to controller 17 and has typically been located in a position close to the passenger cabin and remote from the HVAC unit. A separate fan under control of controller 17 may be packaged with sensor 27 in order to provide adequate airflow. Alternatively, a vacuum line running from the suction side of blower fan 18 to sensor 27 could be provided to draw cabin air over the sensor.

Figure 2:
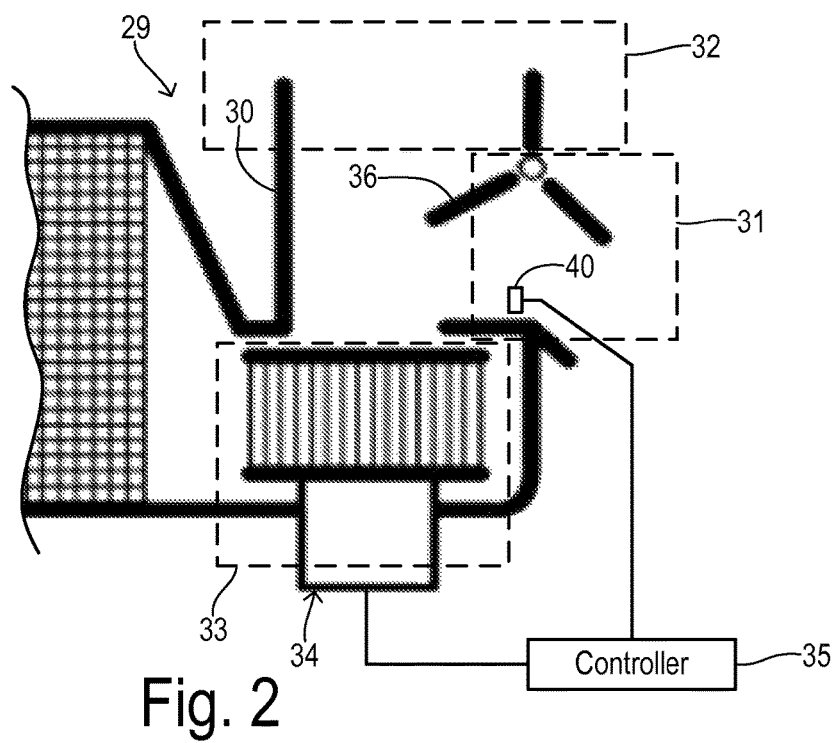
FIG. 2 is a schematic diagram of a portion of an HVAC unit according to one embodiment of the present invention.

The present invention relocates the climate sensor to a recirculation opening on the HVAC unit as shown in FIG. 2. An HVAC unit 29 is generally comprised of a housing 30 which defines a recirculation entry section 31, fresh air entry section 32, and a blower section 33. A blower 34 is mounted in blower section 33 and controlled by a controller 35. When blower 34 is activated by controller 35, an airflow is driven from the HVAC housing 30 out through an output section and into the passenger cabin. A door 36 has a variable position to control a variable flow capacity through recirculation entry section 31 between a minimum flow capacity and a maximum flow capacity. In some embodiments explained below, the minimum flow capacity obtainable by positioning door 36 is greater than zero (i.e., never fully closed) in order to maintain a substantially continuous flow of air from the passenger cabin to blower section 33. In other embodiments, door 36 may be positioned to obtain a zero flow through the door opening as long as a separate dedicated opening is provided in recirculation section 31 to create the substantially continuous airflow for receiving the climate sensor.

Whether obtained by a minimum door opening amount or by a dedicated opening, the recirculation opening of the present invention provides at least a base recirculation flow whenever blower 34 is driving airflow through HVAC unit 29. Climate sensor 40 is mounted at recirculation entry section 31 in order to be fluidically coupled within the base recirculation airflow in order to sense a climate characteristic that is representative of the air in the passenger cabin. The climate characteristic can be temperature, humidity, and/or air quality (e.g., concentration of carbon dioxide, nitrous oxides, volatile organic compounds, or other pollutants). Guide features (not shown) for shaping the base recirculation flow may be provided in housing 30 or door 36, for example. Such guiding features may be especially helpful for ensuring sufficient airflow over sensor 40 when the variable flow capacity of the recirculation entry section 31 is set to its minimum value. When the system is drawing primarily fresh air, the present invention is able to continue to provide sufficient recirculation flow over sensor 40 without significantly impacting the fresh air performance of the HVAC. Thus, the size and/or shape of the opening, and thus the airflow, can be tuned to obtain a desired minimum flow at low HVAC operating points.

Figure 3:
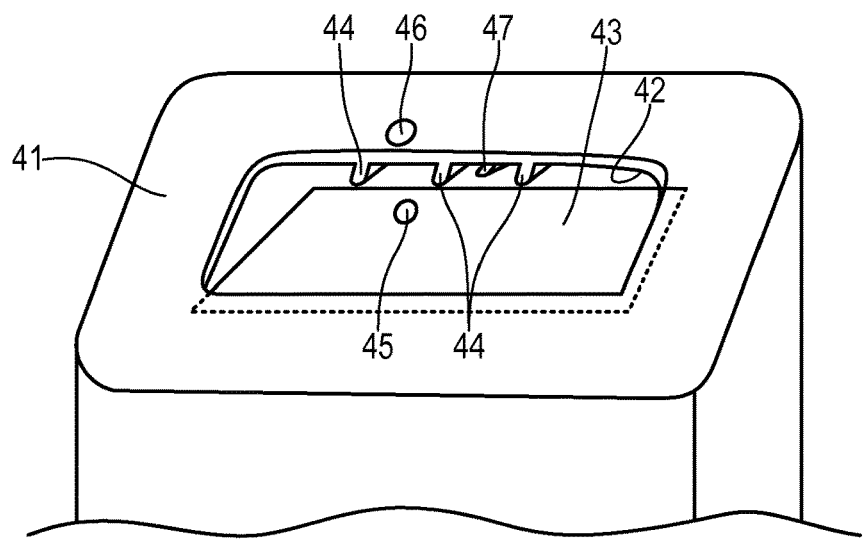
FIG. 3 is a perspective view of a recirculation section of an HVAC unit of the invention.

FIG. 3 shows an embodiment in which a recirculation door is configured to have a minimum flow capacity greater than zero. A recirculation entry section 41 has an opening 42 and a recirculation door 43 movable to control the flow capacity through recirculation entry section 41. One or more ribs 44 can be provided to prevent door 43 from moving to a position that completely closes off opening 42. Consequently, at least a base recirculation flow exists around ribs 44 whenever the blower is activated to drive an airflow through the HVAC system. Proximate to opening 42, the climate sensor may be mounted at various locations that are fluidically coupled with the base recirculation flow and that also remain in the recirculation flow when door 43 is opened at greater flow capacity positions. Thus, the climate sensor may be placed at a location 45 on door 43, a location 46 on the exterior side of recirculation entry section 41, or a location 47 on the interior side of recirculation entry section 41, for example. Wiring (not shown) couples a sensor placed in locations 45, 46, or 47 with the HVAC controller. Alternatively, a wireless sensor could be used that uses an RF transmitter.

Figure 4:
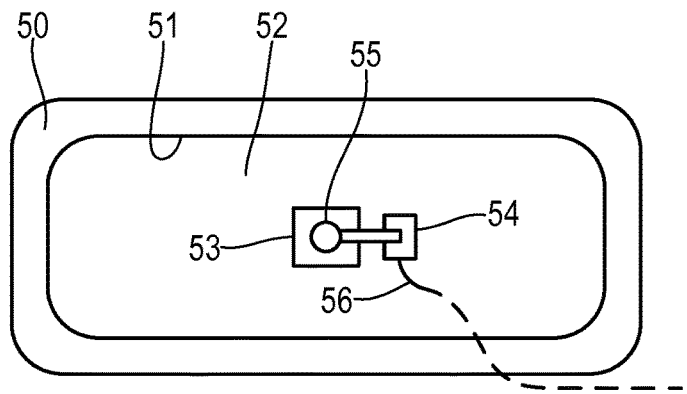
FIG. 4 is a plan view of a climate sensor mounted to a recirculation door according to a further embodiment of the invention.

FIG. 4 shows an alternative embodiment wherein an HVAC housing has a wall 50 on the recirculation entry section receiving a recirculation opening 51 and a recirculation door 52. In this embodiment, door 52 can close to a position that would provide a zero flow through recirculation opening 51. In order to provide the base recirculation flow, a dedicated recirculation opening 53 is made in door 52. Opening 53 could be an aperture as shown or could include a notch formed at an edge of door 52. A mounting block 54 supports a climate sensor 55 so that it is suspended within the profile of opening 53. A conductor wire 56 provides an electrical sensor signal to the controller.

Figure 5:
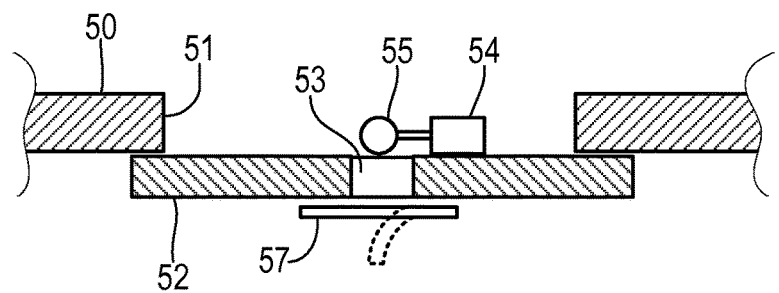
FIG. 5 is a side cross-sectional view of the embodiment of FIG. 4.

FIG. 5 shows the arrangement of FIG. 4 in cross-section. When the HVAC unit is not operating (i.e., the blower is turned off) then it may be desirable for the interior of the HVAC unit to be fluidically isolated from the air in the passenger cabin. Thus, a flexible flap 57 may be provided for covering opening 53 to prevent air flow in the reverse direction (i.e., from the HVAC unit out through the recirculation entry section). One side of flap 57 is mounted to door 52. Flap 57 is bendable away from opening 53 in response to an air pressure difference between the passenger cabin and the blower in order to admit air from the passenger compartment while door 52 is closed but the blower is on. Opening 53 and flap 57 could also function as an air extractor that opens during the closing of the passenger entry doors to reduce the door closing effort.

Figure 6:
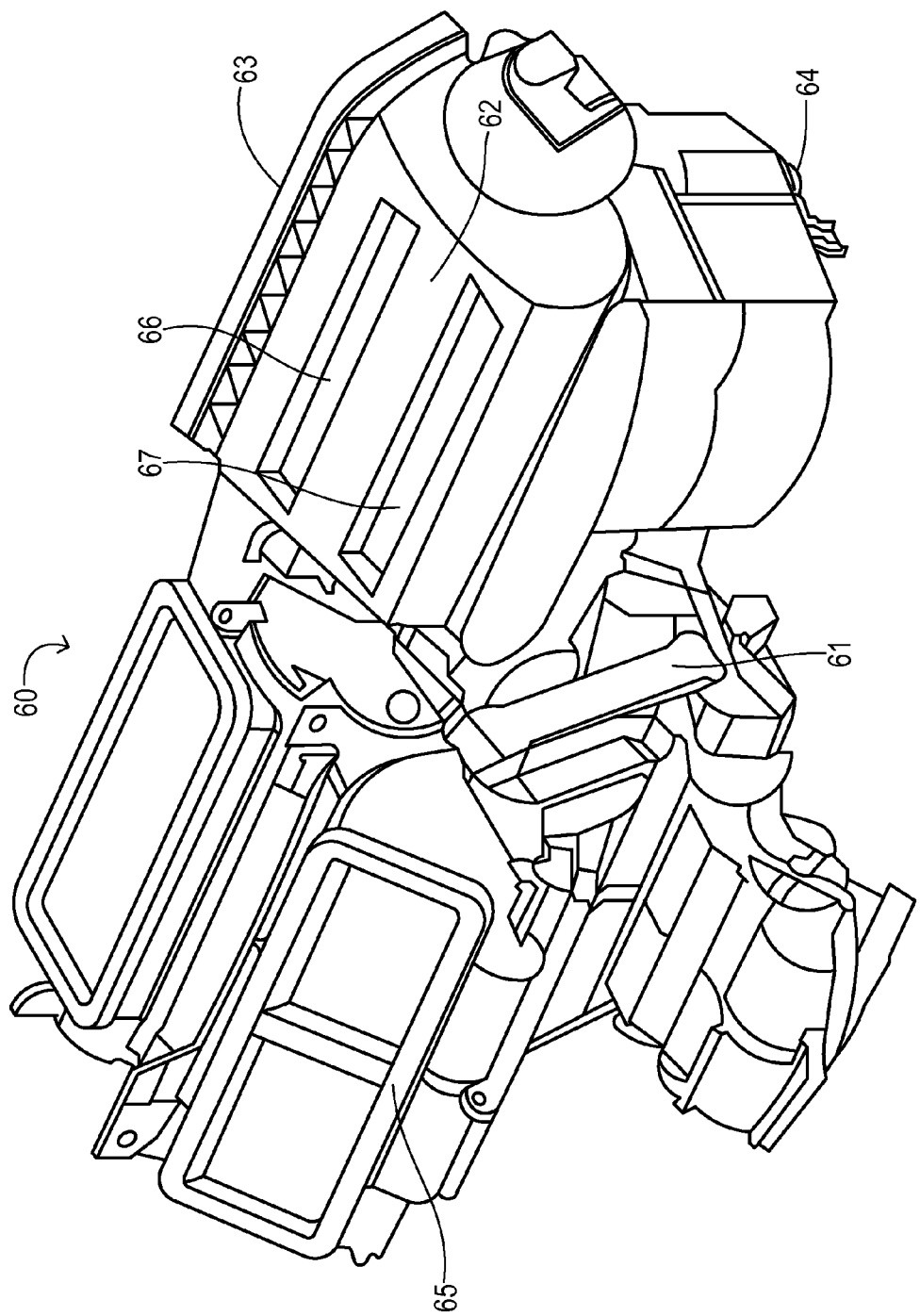
FIG. 6 is a perspective view of an HVAC unit of another embodiment.
Figure 7:
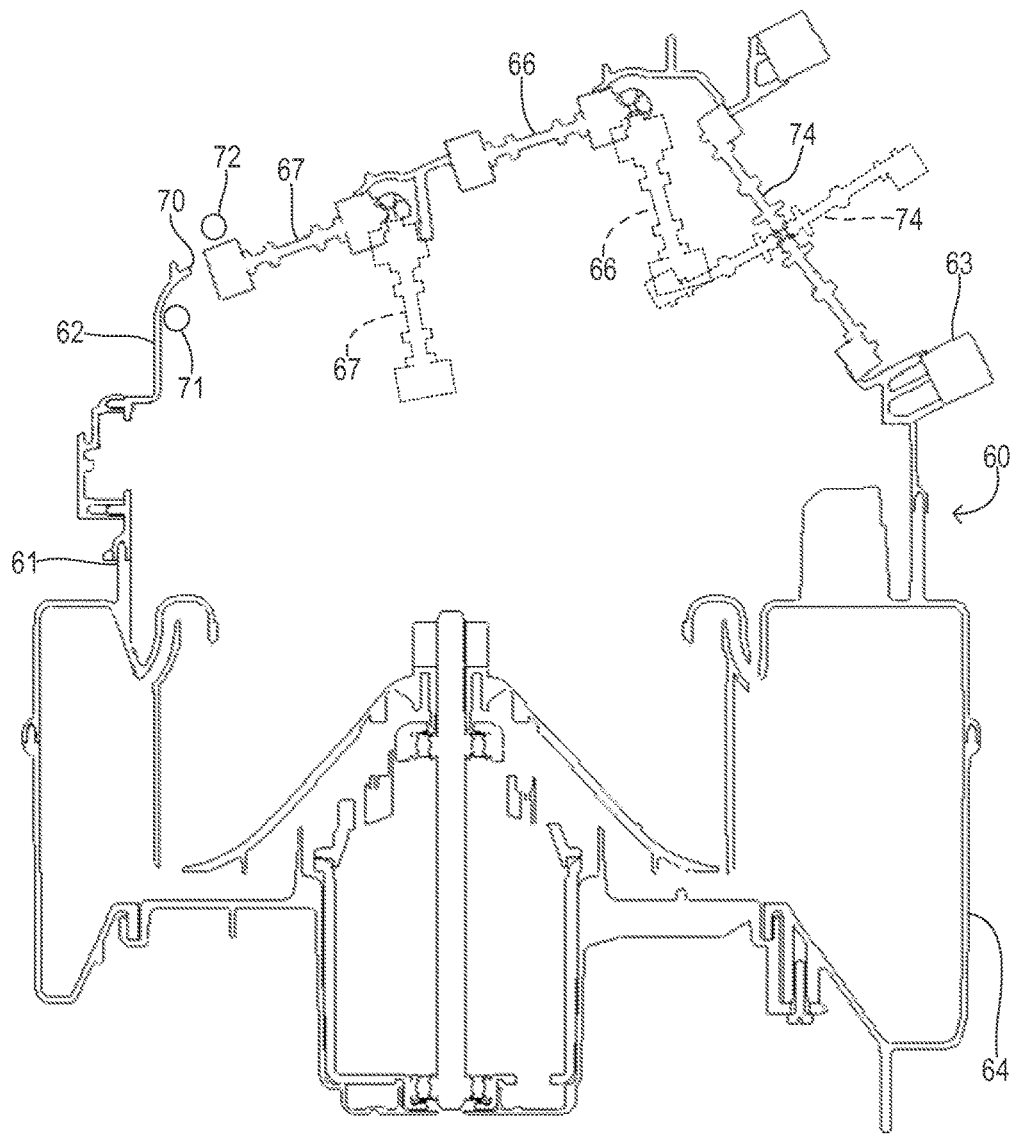
FIG. 7 is a cross section of one embodiment for incorporating the climate sensor of the invention in the HVAC unit of FIG. 6.

In another embodiment, FIGS. 6 and 7 show an HVAC unit 60 with an HVAC housing 61. Housing 61 includes recirculation section 62, fresh air section 63, blower section 64, and output section 65. Recirculation doors 66 and 67 are arranged in respective openings in recirculation section 62. As seen in the cross-sectional view of FIG. 7, doors 66 and 67 have respective closed positions (shown in solid lines) and open positions (shown in dashed lines). With door 67 in its closed position, a gap 70 is formed at the edge of door 67 to provide a recirculation opening to support the base recirculation flow. A sensor 71 can be mounted at a fixed position on the interior wall of recirculation section 62 proximate to door 67. Alternatively, a climate sensor 72 may be mounted directly on recirculation door 67. A fresh air door 74 is also shown for controlling the airflow through fresh air section 63.

Figure 8:
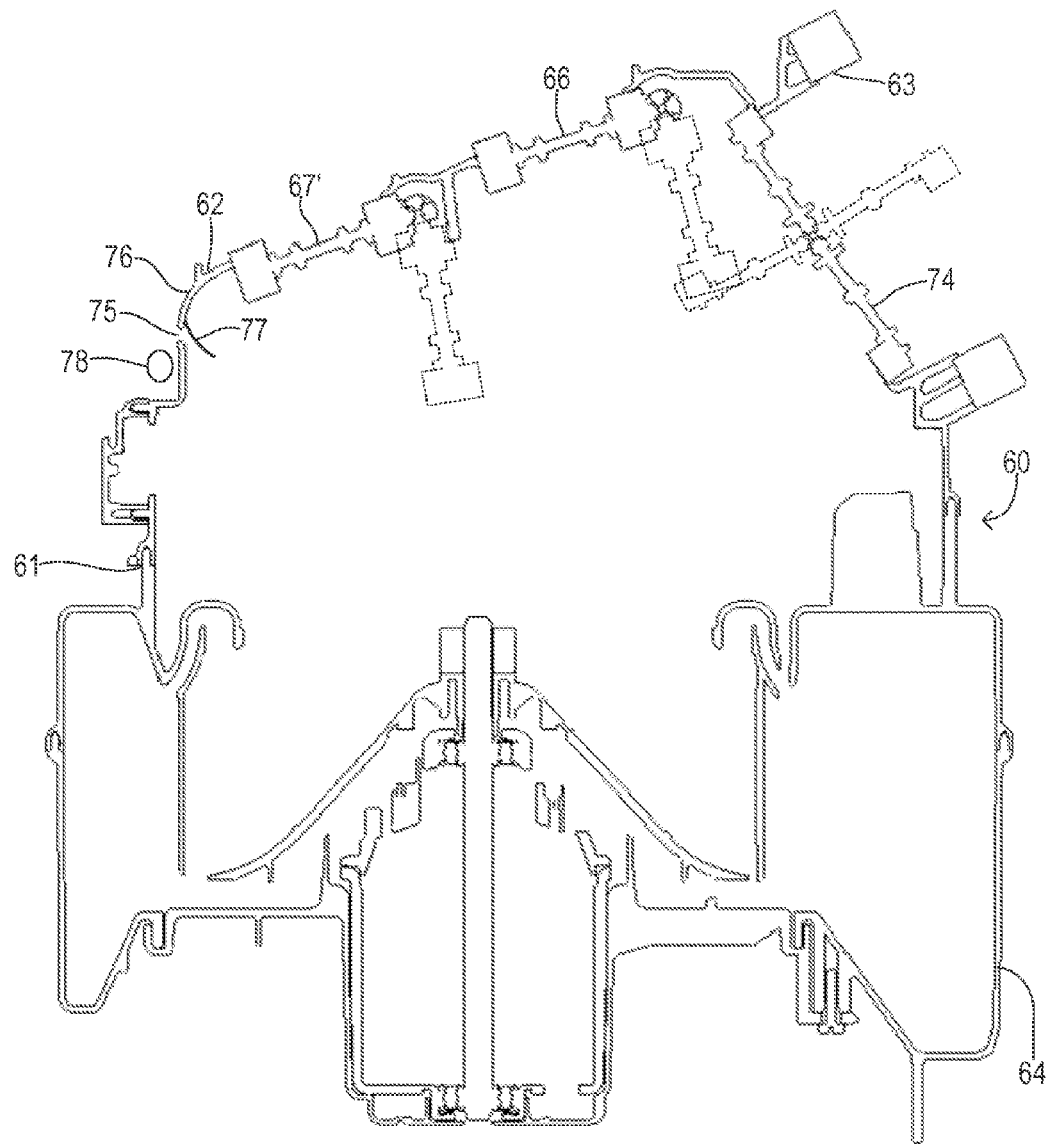
FIG. 8 is a cross section of another embodiment for incorporating the climate sensor of the invention in the HVAC unit of FIG. 6.

FIG. 8 shows an alternative embodiment wherein a recirculation door 67' is arranged to completely close off the respective opening. In this case, the recirculation opening for providing the base recirculation flow is comprised of an aperture 75 in a wall 76 of housing 61 within recirculation section 62. A flexible flap 77 is associated with aperture 75, and a climate sensor 78 is mounted to wall 76 adjacent to or within aperture 75.

Figure 9:
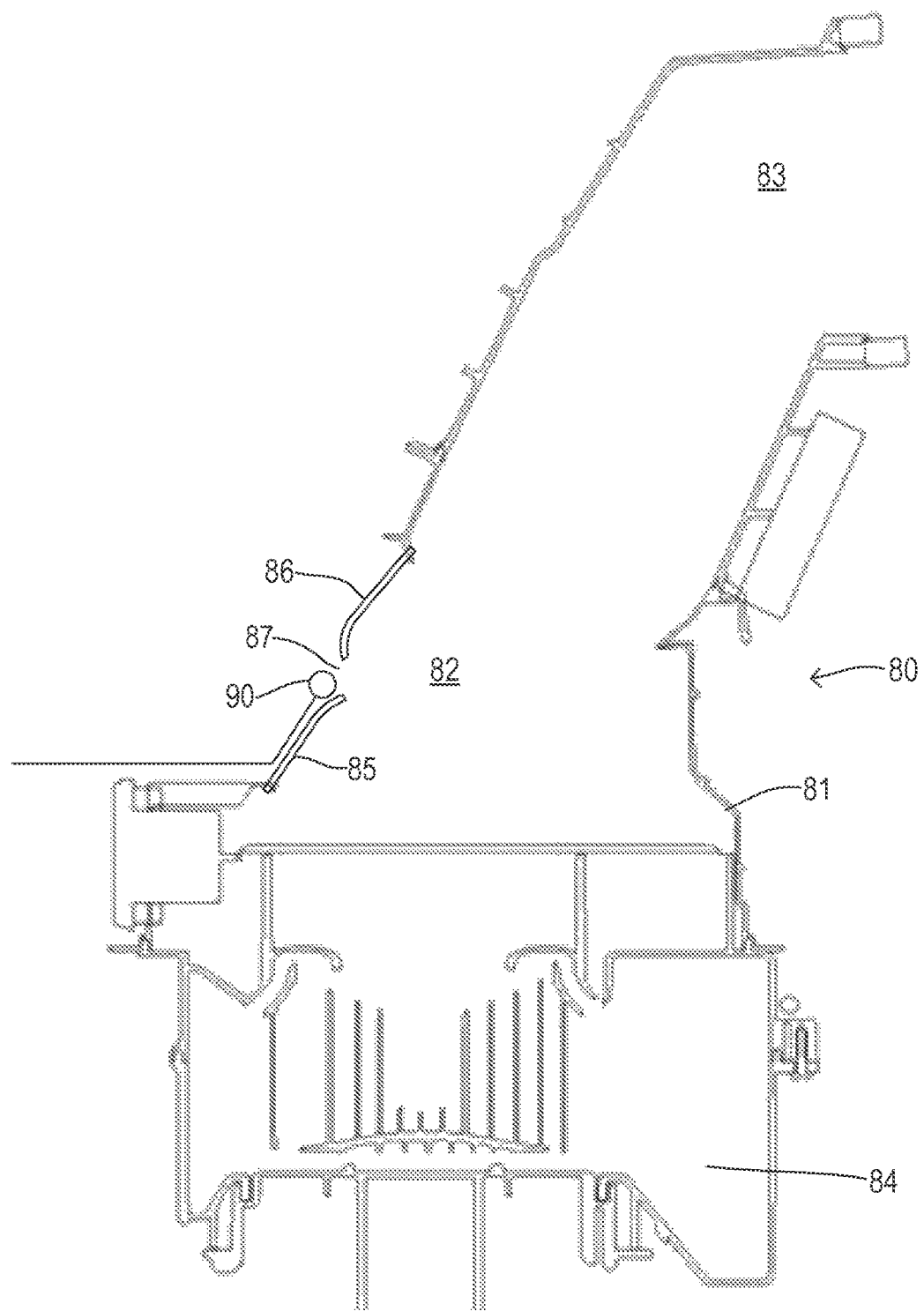
FIGS. 9 and 10 are cross sections of another embodiment wherein a climate sensor is mounted to swinging doors.
Figure 10:
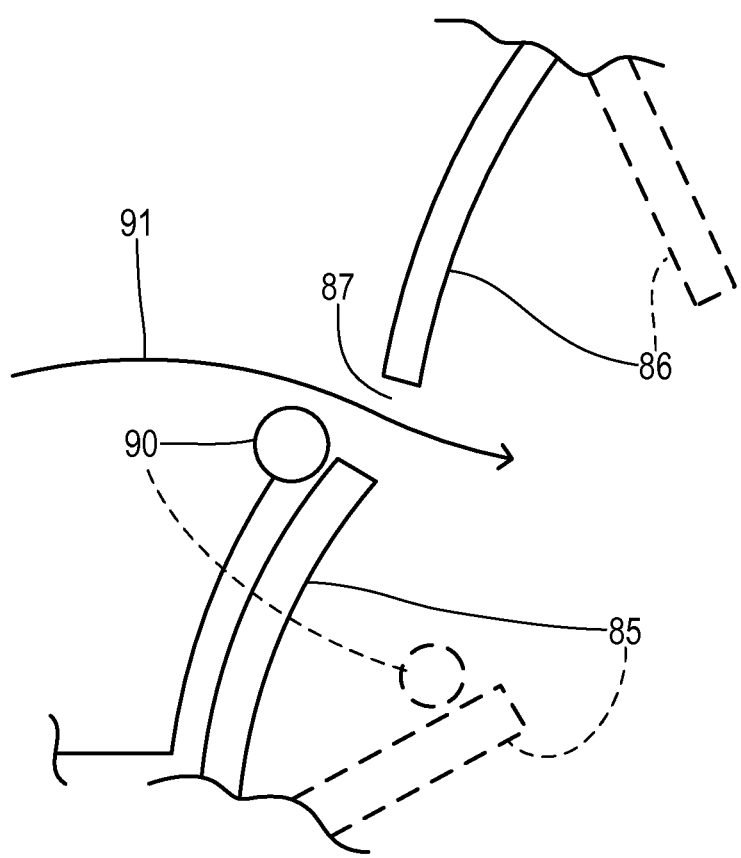

FIGS. 9 and 10 illustrate an alternative embodiment wherein an HVAC unit 80 has a housing 81 with a recirculation entry section 82, a fresh entry section 83, and a blower section 84. A pair of cooperating doors 85 and 86 selectably vary an airflow through recirculation entry section 82. Doors 85 and 86 are shown in a maximally closed position for providing a minimum flow capacity in FIG. 9. A resulting base recirculation flow 91 as shown in FIG. 10. A gap 87 is formed between opposing edges of doors 85 and 86. A climate sensor 90 is mounted to the edge of door 85 in order to be fluidically coupled with the base recirculation flow so that a temperature and/or humidity measurement representative of the air in the passenger cabin is provided to the HVAC controller. When doors 85 and 86 are increasingly opened as shown in dashed lines, a greater flow capacity is obtained through recirculation section 82. With sensor 90 mounted to door 85, it continues to be well placed in the recirculation flow for obtaining an accurate measurement.

The present invention may operate according to a method wherein a climate characteristic is sensed for the interior air in a passenger cabin of a vehicle. The vehicle includes an HVAC unit containing a blower for driving an airflow from a recirculation entry section and a fresh entry section to an output section delivering the airflow to the passenger cabin. The method selectably blends proportions of interior air from the recirculation entry section and outside air from the fresh entry section into the blower. At all blending proportions, the method maintains at least a base recirculation flow via the recirculation entry section from the passenger cabin. The desired climate characteristic is sensed within the base recirculation flow using a climate sensor disposed to receive the base recirculation flow prior to blending. In other words, the airflow from the passenger cabin passes over the climate sensor before mixing with any fresh air.

What is claimed is:

1. An HVAC unit for treating air in a passenger cabin of a vehicle, comprising:
    an HVAC housing with a recirculation entry section, a fresh entry section, a blower section, and an output section;
    a blower mounted to the blower section for driving an airflow from the HVAC housing out through the output section into the passenger cabin;
    a fresh entry door having a selectable position for providing a variable flow capacity through the fresh entry section;
    a recirculation opening proximate the recirculation entry section for providing at least a base recirculation flow from the passenger cabin into the HVAC housing whenever the blower drives the airflow;
    a climate sensor mounted at the recirculation entry section and fluidically and continuously coupled within the base recirculation flow for sensing a climate characteristic representative of the air in the passenger cabin; and
    a recirculation door, adjacent to the climate sensor, having a selectable position for providing a variable flow capacity through the recirculation entry section between a minimum flow capacity and a maximum flow capacity.

2. The HVAC unit of claim 1 wherein the recirculation door has a minimum flow capacity equal to the base recirculation flow, wherein the base recirculation flow is sufficient to maintain a substantially continuous flow of air from the passenger cabin to the blower section over the climate sensor.

3. The HVAC unit of claim 2 wherein the climate sensor is mounted to the recirculation entry section proximate to the recirculation door.

4. The HVAC unit of claim 1 wherein the variable flow capacity of the recirculation door varies between a substantially zero flow capacity and a maximum flow capacity,
    wherein the recirculation entry section includes a housing wall,
    wherein the recirculation opening is formed in the housing wall, and
    wherein the recirculation opening is not in contact with the recirculation door.

5. The HVAC unit of claim 4 further comprising a flexible flap covering the recirculation opening and movable away from the recirculation opening in response to an air pressure difference between the passenger cabin and the blower section in order to admit air from the passenger cabin when the position of the recirculation door corresponds to the zero flow capacity.

6. The HVAC unit of claim 1 wherein the climate characteristic is an air temperature.

7. The HVAC unit of claim 1 wherein the climate characteristic is a humidity.

8. The HVAC unit of claim 1 wherein the climate characteristic is concentration of nitrous oxides.

9. The HVAC unit of claim 1 wherein the recirculation opening further comprises a gap between an edge of the recirculation door and the HVAC housing, past which the base recirculation flows; and
    wherein the climate sensor is mounted immediately adjacent the gap.

10. The HVAC unit of claim 1, further comprising
    wherein the fresh air door and recirculation door selectably blend proportions of the outside air and the air from the passenger cabin into the blower, wherein the blended proportions include a fresh air mode primarily drawing outside air, and wherein the base recirculation flow is sufficient to operate the climate sensor when the fresh air door is fully open.

11. A method of sensing a climate characteristic for interior air in a passenger cabin of a vehicle, wherein the vehicle includes an HVAC unit containing a blower for driving an airflow from a recirculation entry section, a fresh entry section to an output section delivering the airflow to the passenger cabin, a fresh entry door having a selectable position for providing a variable flow capacity through the fresh entry section, a recirculation door having a selectable position for providing a variable flow capacity through the recirculation entry section, and a climate sensor mounted proximate the recirculation door, the method comprising the steps of:
    selectably blending proportions of interior air from the recirculation entry section and outside air from the fresh entry section into the blower;
    at all blending proportions, including a maximum proportion of outside air from the fresh entry section, maintaining at least a base recirculation flow via the recirculation entry section from the passenger cabin;
    sensing a climate characteristic of the base recirculation flow using the climate sensor continuously immersed in the base recirculation flow and disposed to receive the base recirculation flow prior to blending.

12. A vehicular HVAC unit, comprising:
   a housing having a recirculation entry section and containing a blower for driving an airflow into a passenger cabin;
   a recirculation door proximate the recirculation entry section for regulating the airflow and providing at least a base recirculation flow from the passenger cabin into the housing whenever the blower drives the airflow; and
   a climate sensor on the door immersed in the base recirculation flow for sensing a climate characteristic.

13. The HVAC unit of claim 12 wherein the climate characteristic is a climate characteristic selected from the set consisting of: temperature, humidity, concentration of carbon dioxide, concentration of nitrous oxides, and concentration of volatile organic compounds.

14. An HVAC unit for treating air in a passenger cabin of a vehicle, comprising:
   an HVAC housing with a recirculation entry section, a fresh entry section, a blower section, and an output section;
   a blower mounted to the blower section for driving an airflow from the HVAC housing out through the output section into the passenger cabin;
   a recirculation opening proximate the recirculation entry section for providing at least a base recirculation flow from the passenger cabin into the HVAC housing whenever the blower drives the airflow; and
   a climate sensor fluidically coupled within the base recirculation flow for sensing a climate characteristic representative of the air in the passenger cabin; and
   a recirculation door having a selectable position for providing a variable flow capacity through the recirculation entry section between a minimum flow capacity and a maximum flow capacity, wherein the minimum flow capacity is greater than zero and is sufficient to maintain a substantially continuous flow of air from the passenger cabin to the blower section over the climate sensor, and wherein the climate sensor is mounted to the recirculation door.

15. The HVAC unit of claim 14 wherein the climate characteristic is an air temperature.

16. The HVAC unit of claim 14 wherein the climate characteristic is a humidity.

17. The HVAC unit of claim 14 wherein the climate characteristic is an air quality.

* * * * *